United States Patent

[11] 3,581,834

[72] Inventors Jackson M. Kellner;
William R. Garrett, both of Midland, Tex.
[21] Appl. No. 842,672
[22] Filed July 17, 1969
[45] Patented June 1, 1971
[73] Assignee Smith International, Inc.
Midland, Tex.

[54] TELESCOPIC DRILL STRING UNIT
68 Claims, 21 Drawing Figs.
[52] U.S. Cl. .................................................. 175/321, 64/2
[51] Int. Cl. .................................................. E21b 17/00
[50] Field of Search .................................... 175/306, 321, 40; 64/1, 2, 11, 27; 285/333; 92/172, 243

[56] References Cited
UNITED STATES PATENTS
| | | | |
|---|---|---|---|
| 2,987,129 | 6/1961 | Webb | 175/321 |
| 3,225,566 | 12/1965 | Leathers | 175/321 |
| 3,410,355 | 11/1968 | Garrett | 175/40 |
| 3,463,252 | 8/1969 | Miller et al. | 175/321 |

Primary Examiner—James A. Leppink
Attorneys—Murray Robinson, Ned L. Conley, Robert W. B. Dickerson and Bill B. Berryhill ABSTRACT: Telescopic drill string unit including outer tube and inner tube axially slidable within outer tube, connections at upper end of outer tube and lower end of inner tube for making connection with other drill string members to transmit fluid and force, bearing means to transmit lateral forces and bending moment between inner and outer tubes, splines and slots to transmit torque between inner and outer tubes, shoulder stops to limit relative axial travel of tubes in both directions. Splines may be mounted in a split annular cage. Cage may be mounted inside the outer tube by having external threads at both ends, the outer tube being divided into upper and lower parts screwed onto the cage. The pins may be anchored against axial travel in the cage. A seal pipe may be connected to upper end of the outer tube and telescope into inner tube, the inner tube carrying an annular replaceable seal unit including a rubber sleeve bonded to an inverted fusiform metal ring. A choke ring may be provided in connection of seal pipe to outer tube to allow high pressure fluid to bleed from through flow passage of unit to annulus between inner tube and outer tube so as to exclude the low pressure fluid that is outside the unit which may contain deleterious materials. The ring may include a plurality of vertical orifices with adjacent pairs of orifices connected at their upper ends and adjacent orifice pairs staggered relative to the first mentioned pairs being connected at their lower ends to place the orifices in series, the end connections of the orifices being larger than the orifices and requiring radially inward fluid travel, thereby to effect pressure drop while maintaining a flow passage too large to be easily blocked.

Jackson M. Kellner
William R. Garrett
INVENTORS

BY Murray Robinson
ATTORNEY

TELESCOPIC DRILL STRING UNIT

BACKGROUND OF THE INVENTION

1. Field of Invention

This invention pertains to telescopic drill string units. Such units are commonly called bumper subs since when included in a drill string such units permit the lower part of the drill string to be jarred upwardly by elevating the upper part of the drill string to rapidly extend the joint to its limit of travel. However such telescopic units have other desirable functions, for example to provide a variable length or slip joint connection in a drill string used in drilling from a floating vessel, or with the inclusion of a resilient member to reduce the amplitude of vibrations transmitted to the upper part of a drill string from the lower part, or with or without the inclusion of signalling means to

2. Description of the Prior Art

Telescopic drill string units usually include an inner tube or mandrel telescoped within an outer tube or housing, and pairs of shoulders or stops limiting relative axial travel of the tubes in both directions. A number of problems are encountered with such units.

For example, assuming the outer tube is to be connected to the upper part of the drill string, in order to position the upper travel limit stop of the inner tube below the upper stop of the outer tube it is known to make the inner tube in two parts that are screwed together when the unit is assembled; see, for example, U.S. Pats. No. 3,033,011, No. 3,099,918, and No. 3,254,508 to Garrett which show vibration dampener type of telescopic drill string unit. Such a connection in the inner tube weakens the unit, especially with respect to stresses imposed when jarring and with respect to bending moments, and hence is to be avoided wherever possible, especially in a bumper sub. An alternative is disclosed in U.S. Pat. No. 3,410,355–Garrett, wherein the stop on the outer tube is a split nut held between two outer tube portions that are screwed together, the nut being welded into an integral ring after assembly about the inner tube.

Another problem encountered with telescopic units relates to the rotary drive means connecting the inner and outer tubes that prevents relative rotation thereof while allowing relative axial travel over a limited range. The conventional rotary drive means for bumper subs or telescopic joints comprises spline means including one or more axially extending keys on one tube engaging one or more axially extending keyways on the other tube.

Such spline means are shown for example in the aforementioned U.S. Pats. No. 3,033,011 and No. 3,410,355. Formation of such spline means tends to weaken the tubes and difficulty is encountered making spline means on the inside of the inner tube. In addition, the spline means should be positioned so that the torque need not be transmitted through the threads of threaded connections of the unit, such as between upper and lower parts of a two part inner tube or outer tube.

A further set of problems exists relative to the means for sealing between the inner and outer tubes to prevent loss of fluid being transmitted by the telescopic unit. It is conventional to connect the upper end of a small pipe, called a seal or wash pipe, to the upper end of the outer tube, the pipe extending down inside the inner tube, either the pipe or inner tube including a seal comprising a number of packing rings held in place by gland nuts or shoulders at the ends of the seal. Such seals have a relative short life due to the relative axial motion of the wash pipe and inner tube and must be frequently replaced.

One reason for sealing between the wash pipe and inner tube rather than directly between the inner and outer pipes is the desirability of reducing the net area of the unit effective to extend the unit under the pressure of the fluid being transmitted, the so called pump apart effect. In this regard it may be noted that before the telescopic unit will contract, the axial loading must exceed the pump apart effect. Since a wash pipe transmits no appreciable axial or other force, the wash pipe may have a small wall thickness, thereby minimizing the pump apart effect. For a like reason, it is usual to place the seal on the inner pipe rather than on the wash pipe, for if placed on the washpipe the seal would increase the effective area and increase the pump apart effect. Also, a trap for debris would be formed above a seal on the wash pipe between the wash pipe and the inner tube.

Another problem encountered in the art of telescopic units stems from the fact that the unit acts as a pump in that every contraction of the unit requires fluid in the annulus between the inner and outer tubes to be expelled and upon extension of the unit fluid is sucked into the annulus. If the entering fluid is abrasive, there is excessive wear at the relatively sliding surfaces of the unit, including the spline means, the guide or bearing surfaces (through which bending moments are transmitted), and the seal surfaces. If large particles enter between such surfaces the unit may even become jammed.

One further problem encountered in the construction of telescopic units is common to all down hole drilling tools, provision must be made in case of failure of the unit to avoid "junking the hole" by the components of the tool coming apart into many pieces to be individually fished out.

The present invention addresses itself to solution of the foregoing problems and to the general problem of providing an inexpensive, durable, effective telescopic unit for drill strings.

Another problem encountered with telescopic units resides in the fact that in the event of the lower part of a drill string becoming stuck, the unit is apt to twist apart freeing the upper part of the drill string and leaving the lower part to be fished out of the hole. It is an object of the invention to provide a telescopic unit which in the event of the lower part of the drill string becoming stuck against rotation will part to permit the upper part of the drill string to continue to rotate but will remain connected with respect to transmission of axial forces so that the lower part of the drill string can be pulled out of the hole along with the upper part of the drill string. It is a further object of the invention to provide such a unit wherein in the event of such a failure the upper part of the drill string can still be coupled to the lower part through the unit for rotation of the lower part of the drill string if desired to facilitate freeing the lower part of the drill string.

It is a further object of the invention to provide such a unit wherein in the event of failure of the unit the lower portion of the drill string can still be rotated from the upper portion of the unit if desired and without further damaging the telescopic unit.

SUMMARY OF THE INVENTION

According to the invention the upper stop shoulder on the outer tube comprises a split nut screwed into the outer tube, thereby eliminating the need for parting the mandrel. The nut has the form of a double pin sub and the outer tube is divided into upper and lower parts connected by the sub, whereby the nut may have tapered threads to limit axial travel and insure a tight fit, and to facilitate assembly. The spline means on the outer tube includes pins received in grooves in the split nut which thus forms a cage to hold the pins. Retainer means hold the pins in the lower part of the cage, whereby if the cage parts the upper part of the cage can be pulled free of the pins to prevent rotation of the lower part of the unit or the pins can be engaged by the upper part of the cage to rotate the lower part of the unit. The seal, instead of the usual stack of packing rings, such as shown in U.S. Pat. No 3,410,355–Garrett, is an adaptation of a bonded rubber, slush-pump piston seal disclosed in U.S. Pats. No. 3,172,341–Garrett and No. 3,232,186–Garrett et al. turned inside out however so as to be detachably mounted on the outer tube rather than as are shown in the slush, pump piston type seals of the aforementioned U.S. Pats. No. 3,172,341 and No. 3,232,186. The elastomeric, slush-pump piston type seal is better adapted to withstand both sliding wear and abrasive fluids than is the usual stack of packing rings. To minimize abrasive action, a bleed port is provided to admit high pressure fluid from the through fluid passage or conduit of the unit into the annulus between the inner and outer tubes, thereby to fill the annulus with the conduit fluid. The conduit fluid is usually much cleaner and less abrasive than the external fluid that occupies the annular space in the well bore around the drill string. The conduit fluid constantly purges the annulus between the inner and outer tubes of any external fluid that is sucked in during extension of the unit. To provide a bleed port of such flow resistance as to prevent rapid erosion and excessive loss of conduit fluid, and which is of such size as not to be easily blocked with debris, a plurality of large orifices are connected in series with a plurality of expansion chambers in a tortuous configuration formed in an orifice ring. To facilitate passage of fluids and solids out of the annulus between the outer and inner tubes, fluid passages in the form of flutes are provided between the close fitting surfaces such as the bearing means and adjacent the spline means. Other features of the invention and various modifications are disclosed in the following detailed description of preferred embodiments of the invention, but these are merely exemplary.

DESCRIPTION OF PREFERRED EMBODIMENTS

Figure 1A:
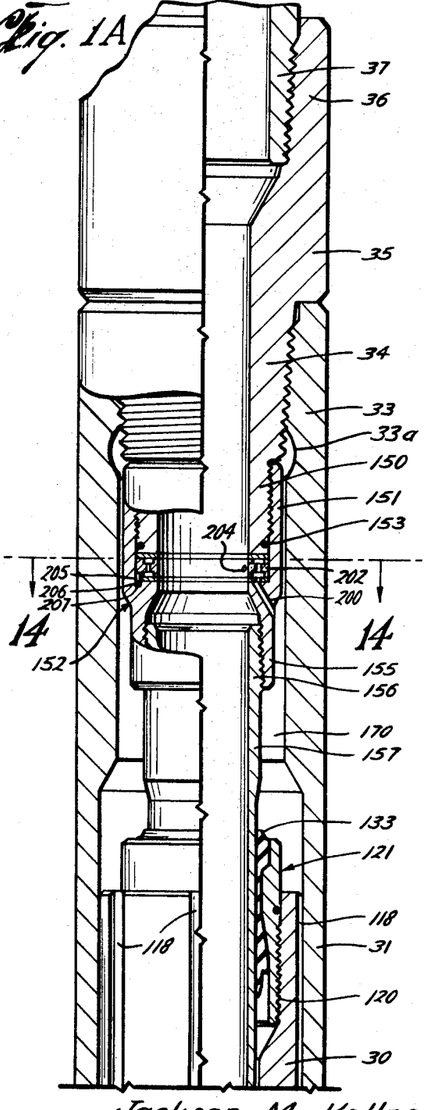
FIGS. 1A and 1B together form a vertical section through a telescopic drill string unit embodying the invention, the FIG. 1B section being taken on the planes indicated in FIG. 3.
Figure 1B:
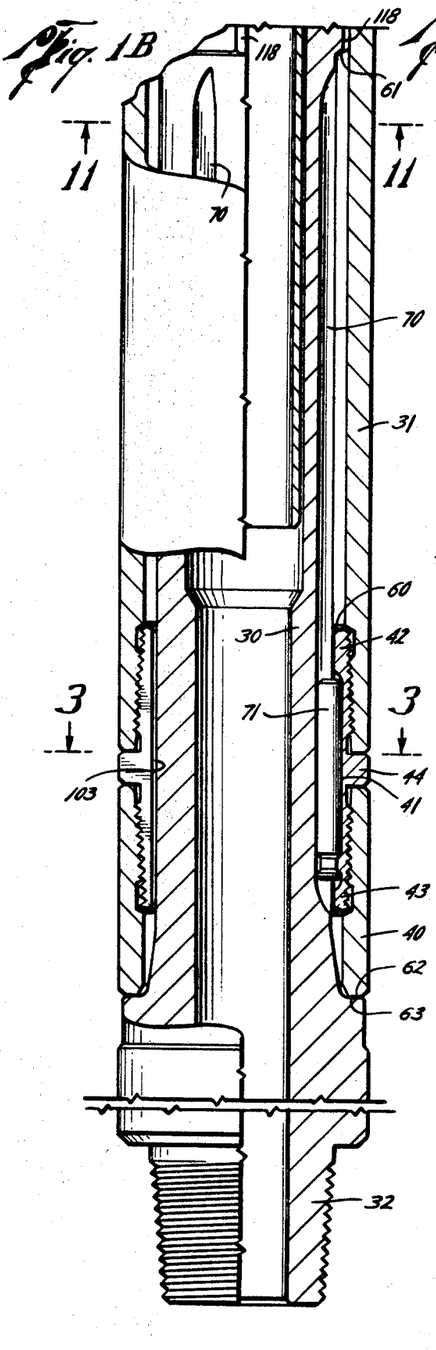

Referring now to FIGS. 1A and 1B there is shown a telescopic drill string unit including an inner tube or mandrel 30 and an outer tube or housing including a midportion 31. A threaded pin 32 at the lower end of the mandrel provides means for making fluid and force transmitting connection with a lower part of the drill string. The upper end of the midportion of the housing is provided with a tool joint type threaded box 33 which is relieved at 33a as described in U.S. Pat. No. 2,745,685 to Moore. Box 33 receives the threaded pin 34 provided at the lower end of the upper portion 35 of the housing. A threaded socket at the upper end of the upper portion of the housing provides means for making fluid and force transmitting connection with an upper part of the drill string such as pin 37. The lower portion 40 of the housing is connected to the midportion 31 by a connector portion of the housing in the form of a double pin sub 41.

Figure 3:
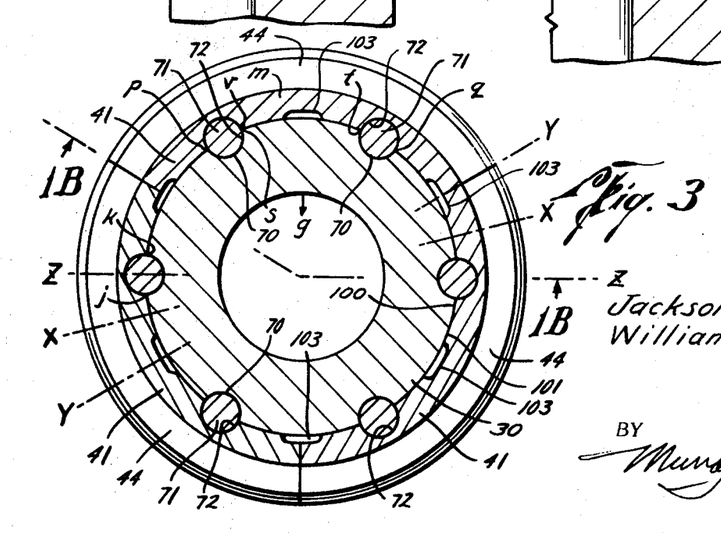
FIG 3 is a horizontal section looking down at plane 3-3 of FIG. 1A and FIGS. 3A and 3B are similar but fragmentary sections showing modifications.

As shown in FIG. 3, the sub 41 is divided axially into three like portions. These three portions will be spoken of hereinafter as forming a single sub, since that is there mode of operation except for assembly purposes as hereinafter described.

As shown in FIG. 1B, the sub 41 includes an upper pin 42, and a lower pin 43. The body of the sub may have the same outer diameter as the housing forming a radial flange 44 extending between the midportion and lower portion of the housing.

Figure 2:
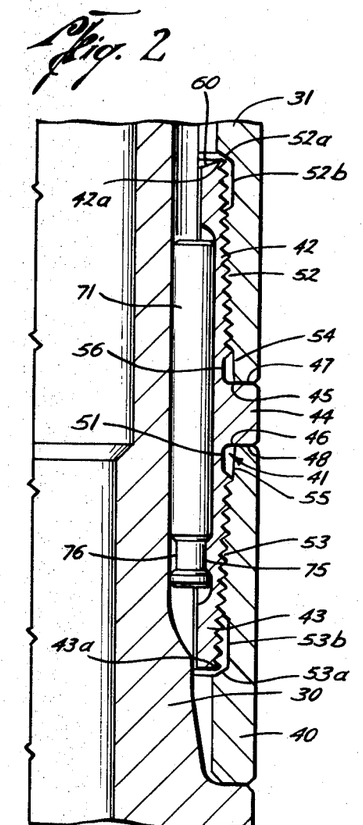
FIG. 2 is an enlarged fragmentary vertical section through a portion of the rotary drive and axial travel limit stop means of the unit shown in FIG. 1A and 1B.

As best shown in FIG. 2, the flange provides an upwardly facing shoulder 45 and a downwardly facing shoulder 46 adapted to engage shoulders 47, 48 provided by the lower end of the midportion of the housing and the upper end of the lower portion of the housing. The pins 42 and 43 are externally tapered and threaded except at the bases 50, 51 of the pin which are smooth and cylindrical. The lower end of midportion 31 of the housing and the upper end of the lower portion 40 of the housing are provided with sockets 52, 53, which are internally tapered and threaded except at their mouths 54, 55 which are smooth and cylindrical.

Sub 41 is screwed up tight into housing portions 31 and 40 to place the mouths 54, 55 in compression and the bases 50, 51 in tension, producing enough frictional resistance at shoulders 45, 47 and 46, 48 to transmit whatever torque the housing is required to transmit.

Figure 4:
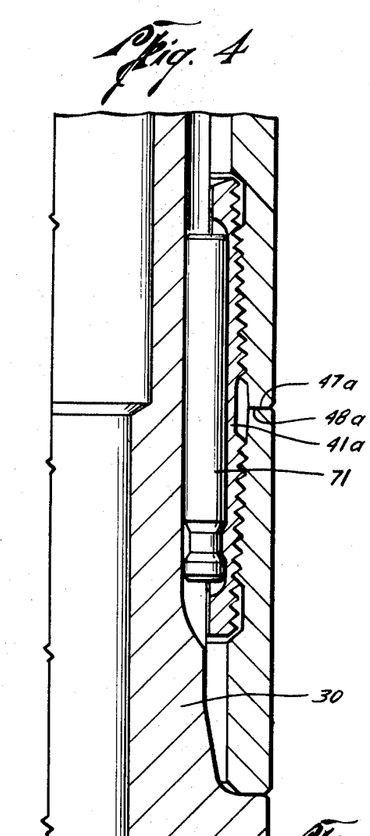
FIGS. 4, 5 & 6 are views similar to FIG. 2 showing modifications.

FIG. 4 illustrates a modification wherein the flange 44 is omitted and the shoulders 47a and 48a abut each other with sufficient force to produce the frictional resistance needed to transmit the torque. The connector portion 41a of the housing thus is in the form of a buried pin. The buried pin connection is a little stronger than the construction shown in FIG. 2 but a little more difficult to assemble. With the foregoing exceptions, the FIG. 4 construction is the same as that of FIG. 2, including the axial travel limit and rotary drive means hereinafter described.

Referring again to FIG. 1B, the upper end of the connector portion of the housing provides an upwardly facing shoulder stop 60 which cooperates with downwardly facing shoulder stop 61 on the mandrel, these two upper shoulders providing means to limit axial extension of the telescopic drill string unit. The shoulders 60 and 61 are conical making an angle of 5° with the perpendicular to the unit axis and flaring upwardly. This provides a slight camming action tending to press the upper end of the sub outwardly into tighter engagement with the midportion 31 of the housing whenever the shoulders 60, 61 come together with the impact, as during jarring.

The lower end of the lower portion 40 of the housing provides a downwardly facing shoulder stop 62 which cooperates with an upwardly facing shoulder stop 63 on the mandrel, these two lower shoulders providing means to limit axial contraction of the telescopic drill string unit. Since these lower stops are integral with the housing and mandrel respectively, they are square shoulders, there being no need for the camming action of the upper stop shoulders.

Referring now also to FIGS. 2 and 3 as well as FIG. 1B, rotary drive means for the unit, i.e. means to transmit torque between the inner tube or mandrel and the outer tube or housing, is provided in the form of spline means. The spline means includes one or more keyways provided by semicylindrical grooves or flutes 70 extending axially on the exterior surface of the mandrel. The spline means further includes one or more cylindrical pins 71 which are axially slidable in the grooves 70. The pins are mounted in semicylindrical grooves or recesses 72 on the interior of the connector portion 41 of the housing. The connector 41 thus provides a cage to hold the pins 71.

The pins are held against axial motion relative to the connector portion 41 by retention means including a rib 75 in the lower portion of each groove 70 engaging an annular groove 76 in the lower end of each pin 71. Should the sub 41 fail in use, e.g. by breaking off at base 50 or 51, the pins 70 will be retained in the lower part of the sub 41 by retention means 75, 76, thereby rendering the rotary drive means inoperative if the upper part of the unit is elevated sufficiently for the broken off portion of the connector sub or cage 41 to clear the pins. It may be desired to continue to rotate the upper portion of the drill string while freeing the lower portion thereof, e.g. if the failure of the unit was caused by the lower part of the drill string being stuck in the hole with respect to rotation. On the other hand, if it is desired to rotate the lower part of the drill string from the upper part of the drill string the grooves 70 in the upper part of sub 41 can be engaged with the pins 71 in the manner of a jaw clutch.

It is to be noted that the ends of the connector pins 42, 43 are provided with 45° bevels or safety shoulders 42a and 43a which can engage the correlative 45° bevels or safety shoulders 52a, 53a at the ends of the threaded portions 52, 53 of the sockets in midportion 31 and bottom portion 40 of the housing. If the connector pins 42, 43 make up farther in the sockets following failure of the connector sub, engagement of the safety shoulders 42a, 43a with shoulders 52a, 53a will stop such make up before the hoop tension in housing portions 31 and 40 reaches the yield or bursting point.

Normally the safety shoulders are not in engagement, the ends of the connector pins 42, 43 extending beyond the threaded portions of the sockets into unthreaded stress relief grooves 52b, 53b only as far as required to make up the pins tight in the sockets, such distance being somewhat variable due to manufacturing tolerances in the pin and socket dimensions. Also, in the case of the FIG. 2 construction, the engagement of shoulders 45, 46 of the flange 44 with shoulders 47, 48 of the housing portions will limit the degree of make up of the connector pins, and the pins may be axially loaded sufficiently to be tight even though there is still radial clearance at the thread crests. A similar effect results with the FIG. 4 construction upon engagement of shoulders 47a, 48a.

Figure 5:
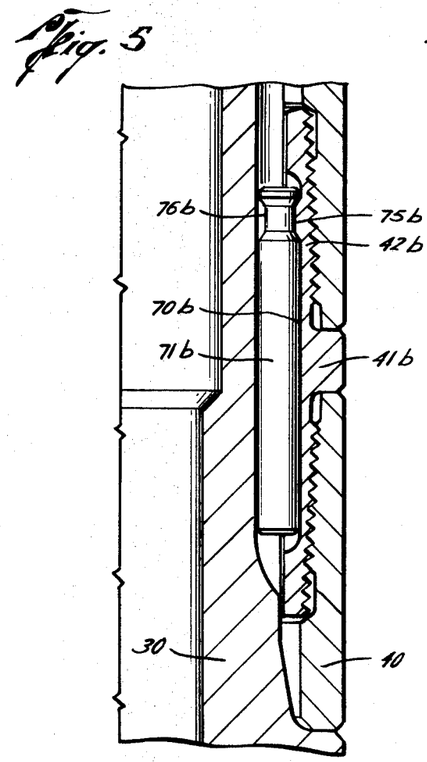

Referring now to FIG. 5, if it is considered more desirable that the rotary drive means be maintained operative in all positions of extension and contraction of the unit by retaining the pins with the upper part of the telescopic unit in the event of failure of the sub, than that the rotary drive means become disengageable, then modified pins 70b may be used including retention means in the form of ribs 75b in the recesses 70b in the upper pin 42b of sub 41b cooperating with annular grooves 76b on the upper ends of the pins. Otherwise the construction of FIG. 5 is the same as that of FIG. 2.

Figure 6:
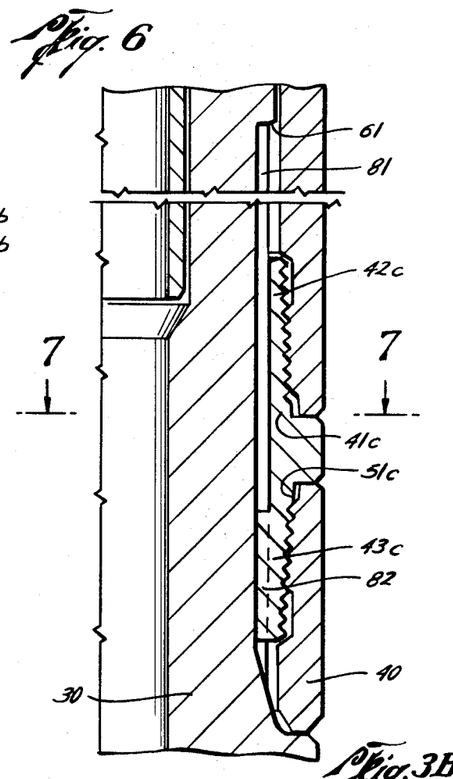
Figure 7:
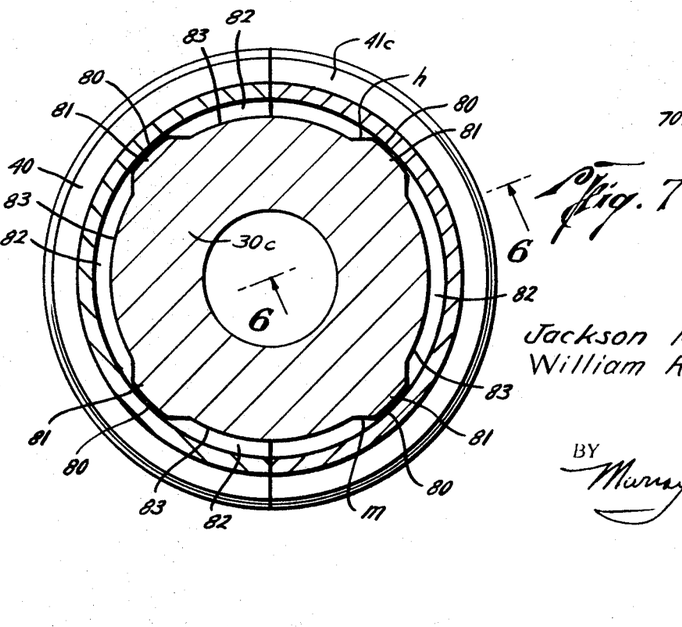
FIG. 7 is a horizontal section looking down at plane 7-7 of FIG. 6.

As shown in FIGS. 6 and 7, if desired the spline means on the housing could be made in the form of one or more keyways 80 in connector sub 41c and the spline means on the mandrel could be in the form of one or more keys 81. The keys may be of any desired cross section but preferably are of trapezoidal cross section as shown. The keyways have sloping sides correlative to the sides of the keys. In any spline type drive means there is a certain amount of indeterminancy as to which are the keys and which are the keyways. For example in the construction of FIGS. 6 and 7 the portions of sub 41c between keyways 80 could be considered to be wide keys 82 and the spaces between keys 81 could be considered to be wide keyways 83. In any event, the keys are integral rather than being formed by separate pins as in the constructions of FIGS. 2, 4, and 5.

The keyways 80 or keys 82 are formed solely in the lower pin 43c of the connector sub 41c, below the base 51c thereof so that if the connector sub 41c should break off at the base of either connector pin 42c, 43c, the bases being the weakest point of such connectors, the rotary drive connection would be disconnected. If it were desired to maintain the rotary drive despite failure of the sub, then the keys or keyways 80 would be extended the full length of the connector sub 41c and the operation would then be similar to that of the FIG. 5 construction. In other respects the operation and construction of the FIG. 6 embodiment is the same as that of the FIG. 1B embodiment of the invention except that the sub 41c is divided into only two parts or segments instead of three, and there are only four keys and keyways instead of six.

Figures 8, 8A, 9, 10:
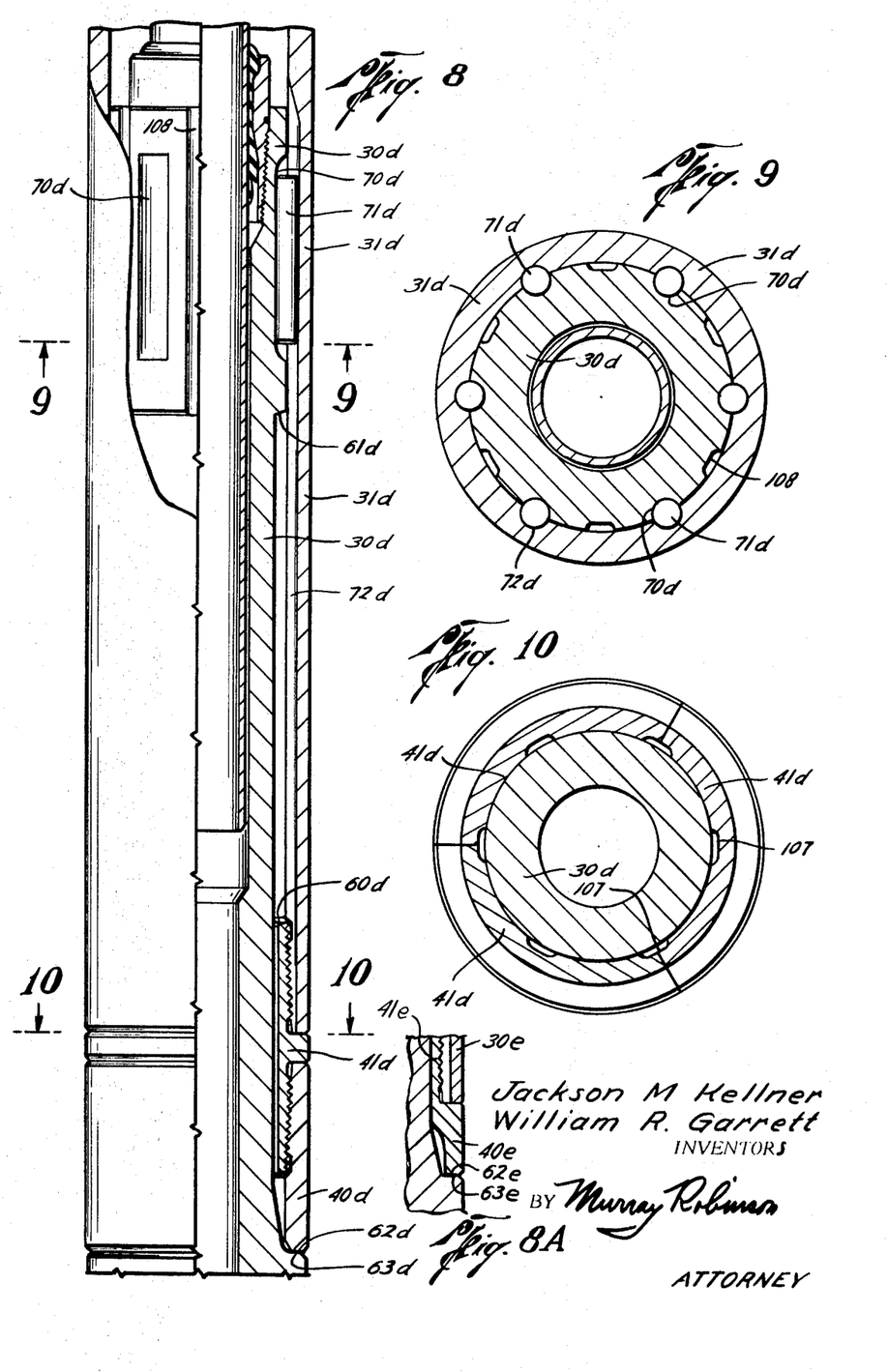
FIG. 8 is a vertical section similar to FIG. 1B showing a modified form of rotary drive and axial travel limit stop means.
FIG. 8A is a fragmentary view similar to FIG. 8 showing a further modification.
FIGS. 9 and 10 are horizontal sections respectively looking up at plane 9-9 and down at plane 10-10 of FIG. 8.

Referring now to FIGS. 8, 9, and 10 there is shown a further modification of the rotary drive and axial travel limit stop means of the telescopic drill string unit. In this construction the connector sub 41d portion of the housing is independent of the rotary drive means, there being no keys or keyways on either the connector sub or the adjacent portion of the mandrel. As before the upper end 60d of the sub cooperates with downwardly facing shoulder 61d on the mandrel to provide stop means limiting extension of the telescopic unit, and the lower end 62d of the housing cooperates with mandrel shoulder 63d to provide stop means limiting contraction of the joint.

As shown in FIG. 8A, the lower end 40e of the housing and the lower end of connector sub 41e could be made integral rather than screwed together. This would shorten the overall length of the unit. The lower end 40e of the housing would be then split axially the same as the connector sub 41e. The split lower end 62e of the sub-housing member 41e —40e would cooperate with shoulder 63e to provide stop means limiting contraction of the joint.

In the construction of FIGS. 8—10, the rotary drive means comprises spline means in which the mandrel portion of the spline means is located above the upper travel limit shoulder 61d on the mandrel. As shown, the spline means includes one or more semicylindrical recesses 70d on the mandrel in which are received one or more cylindrical keys or pins 71d which slide axially in axially extending keyways or grooves.

The grooves 72d extend all the way to the lower end of the midportion 31d of the housing, extending across the threads in which the connector sub 41d is disposed, so that with sub 41d removed the housing portion 31d can be assembled over the mandrel with spline pins 71d in place therearound by lowering the housing portion over the splines. The lower housing portion 62d will have been slipped over the mandrel first prior to placement of pins 71d, and the split connector sub 41d can be assembled at any time thereafter.

With this construction torque is transmitted between the mandrel and housing without going through connector sub 41d or any other threaded connection of less than full drill pipe connector (tool joint) dimensions. In this regard note that the upper housing portion 35 (FIG. 1A) is connected to midportion 31 of the housing by pin 34 and socket 33 of full tool joint size so that this connection is as strong as the rest of the drill string. Although the rotary drive or spline means of the FIGS. 8—10 embodiment is the strongest construction, it is more difficult and expensive to form the long keyways 72d on the inside of the housing than it is to form corresponding keyways 70 on the exterior of the mandrel as in the FIG. 1A embodiment. Of course, it would be possible in an embodiment similar to that of FIG. 8 to place the keyways on the mandrel above shoulder 61d but in that case the length of the unit would be greatly increased over the length of the previously described constructions wherein the spline means and the space between the axial travel limit stop means occupy the same longitudinal portions of the unit, or at least overlap, when the unit is in its contracted position.

As in all of the previous examples of preferred embodiments of the invention, the sub 41d of the FIGS. 8—10 construction is split into a plurality of parts or segments to permit its assembly about the mandrel below the upper stop shoulder on the mandrel, thereby to permit the mandrel to be made integral. As illustrated sub 41d is split into three parts but it could be also divided into any other number of parts greater than one. With certain restrictions the same is true of the subs shown in the preceding examples wherein the sub forms not only a portion of the travel limit stop means but also a portion of the rotary drive spline means. The primary restriction is that the interengaging portions of the spline means, that is the keys and keyways, whether integral or separate, must be shaped and positioned so that the keys can enter the keyways when the segments are placed about the mandrel. The other restriction is that the spline means on the sub segments preferably are positioned so as to facilitate machining thereof.

Reviewing the several split sub constructions hereinbefore described, it will be noted that in FIG. 3 construction wherein the sub is split into three parts, there will be enough clearance so that as the segment $m$ is moved in the direction $g$, the edges $p$ and $q$ of grooves 72 can pass around the pins 71 if the latter are positioned in their grooves 70 on the mandrel. Alternatively, if the pins 70 are positioned in their grooves in the sub, the pins will pass by edges $s$ and $t$ as the segment $m$ is moved in direction $g$. It may be added that the pins may be retained in position during such assembly by means of grease in the grooves in which they are placed or either the pins or the mandrel or both could be magnetized for the same purpose.

Still referring to FIG. 3, if the sub 41 were divided into only two parts along any plane, such as X-X of Y-Y, between the pins 70, then there would be interference preventing assembly. For example if the segment $m$ were moved in direction $g$, the edge $j$ would not clear the adjacent pin 70, or the pin 70 would not clear corner $k$. This difficulty could be overcome however, if the sub were split along a plane, such as Z-Z, passing through two diametrically opposed pins 70, through or close to the axis of the latter.

Figure 3A:
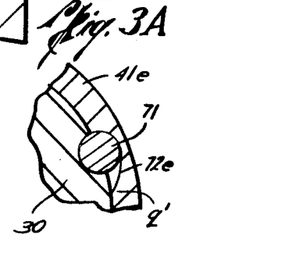

Alternatively or additionally, the leading edge of one or more of the grooves 72 in the connector sub and/or the trailing edge of one or more of the grooves 70 in the mandrel could be relieved to permit or facilitate assembly. The leading edge is judged from the usual direction of rotation which in turn is indicated by the hand of the threads on connector means 32, 36, e.g. clockwise rotation in the case of right-hand threads. FIG. 3A illustrates the manner in which the leading edge 9' of a connector sub groove 72e can be relieved to facilitate assembly. The actual shape and location of such reliefs depends on the geometry and clearance tolerances of the particular construction and on the desired method of assembly. For example with a two-segment sub divided at plan X-X, the segment $m$ might first be placed so that edge $j$ is in position adjacent the corresponding pin 70 and then the segment could be rotated approximately about edge $j$ to bring the relieved edge $q'$ into position. If the latter method of assembly is used, the leading edge $v$ (FIG. 3) should also be relieved. On the other hand if the sub were split along plan Y-Y and the segment $m$ were assembled to the mandrel by motion perpendicular to plane Y-Y, the groove 72 need not be relieved at all at either $p$ or $v$, but relief at leading edge $q$ and at trailing edge $j$ would be necessary. Since relief at a trailing edge of the connector sub would reduce the area of contact for transmission of torque in the usual direction of rotation, relief on the trailing edge of the connector sub's grooves is undesirable.

Figure 3B:
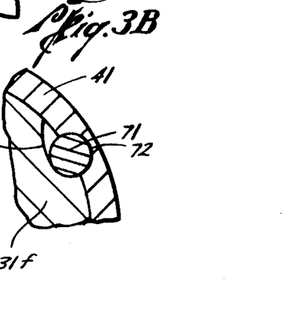

Instead of relieving the grooves on the connector sub, the trailing edges of the grooves of the mandrel could be relieved as shown at 70f in FIG. 3B. Of course the leading edges of the mandrel grooves could also be relieved but again this would reduce the area of contact for transmissions of torque in the usual direction of rotation.

Generally speaking, if the connector sub or cage is divided into as many segments as there are spline pins, it will not be necessary to relieve the spline grooves. Also, under ordinary conditions of clearance and tolerance, it will not be necessary to relieve the spline grooves if there are half as many cage segments as there are spline pins, since the lack of parallelism between the tangents to the outer edges of the grooves for two spline pins will not be sufficient to create interference enough to prevent assembly. Finally if the cage is split on planes passing through or close to the axis of the spline pins, then the number of segments may be as low as one-third the number of spline pins.

Referring now to FIG. 7, it will be seen that if the spline keys and keyways are other than cylindrical the occasions when relief of the keyways will be required will be different. In the first place, if the keys and keyways have widely diverging sloping sides, the clearance and tolerance may be large enough to allow assembly of a two part sub about a four spline mandrel even without parting the sub at a plane passing through the keyways. That is the construction of FIG. 7 wherein it will be noted that sides $h$ and $n$ of the keyways 80 are almost parallel, there being sufficient clearance guaranteed under the specified tolerances to assure that there will be no interference. A second difference with a construction such as that of FIG. 7, wherein other than cylindrical keys are used and the keys are integral with one part of the spline means, lies in the fact that the keys themselves could be relieved to prevent interference during assembly. In fact it could be considered that the FIG. 7 construction is one in which the keys have been relieved from a square configuration to a trapezoidal shape.

Leaving now the topic of assembly of the connector sub segments with the mandrel and considering another aspect of the connector sub construction, it is to be noted that in all of the foregoing constructions of FIGS. 2, 4, 5, 6 and 8 the axial travel limit means would still be operative even if the double pin connector sub broke off at the base e.g. 50 or 51, of one of its pins. In one aspect therefore the subject telescopic unit, except the FIG. 5 embodiment, functions as a safety joint (Compare U.S. Pat. No. 2,808,231 and No. 3,195,927), in that in case of overtorque due to the bit or other lower portion of the drill string becoming stuck in the hole so as not to revolve, the connector sub of the present unit could twist off, thereby breaking the rotary drive connection while maintaining the ability to transmit axial loads. This is a desirable safety feature, for otherwise the drill string might twist off in the middle of a length of drill pipe leaving the lower part of the drill string completely free in the hole and necessitating a difficult fishing operation.

In all of the embodiments so far described, the connector sub, splines, and cooperating surfaces of the mandrel (or housing in FIG. 8) serve as a lower bearing means to transmit lateral forces between the mandrel and housing and cooperate with another upper bearing means, yet to be described, to provide axially spaced apart upper and lower bearing means to transmit bending moment between the mandrel and housing. Thus, in FIG. 3, the outer periphery 100 of the mandrel 30 is in close engagement with the inner periphery 101 of the connector sub, as well as the pins 71 fitting closely within the grooves 70 and 72. To allow solids sucked into the unit upon extension of the unit to escape freely upon contraction of the unit, passage means is provided between the connector sub and the mandrel. Preferably such passage means is formed inside the connector sub, such as axially extending flutes 103. It will be noted that in the FIG. 3 construction the planes dividing the three segments of the connector sub pass through the flutes 103, so that the flutes relieve the edges of the segments to facilitate assembly about the mandrel. However, if preferred, the planes dividing the segments could be offset from the flutes 103, as shown at X-X, falling between the flutes and the spline grooves 77.

In the construction of FIGS. 8—10, the sub 41d fits closely about mandrel 30d, as best shown in FIG. 10, thereby providing the aforementioned lower bearing means. To provide means for passage of solids past the lower bearing means, the flutes 107 are provided in connector sub 41d. In addition, as best shown in FIG. 9, the midportion 31d of the housing fits closely about mandrel 30d, and spline pins 71d closely engage the grooves 70d and 72d, thereby providing an upper bearing means. To provide means for passage of solids past the upper bearing means, flutes 108 are provided in the upper end of the mandrel 30d.

Figure 11:
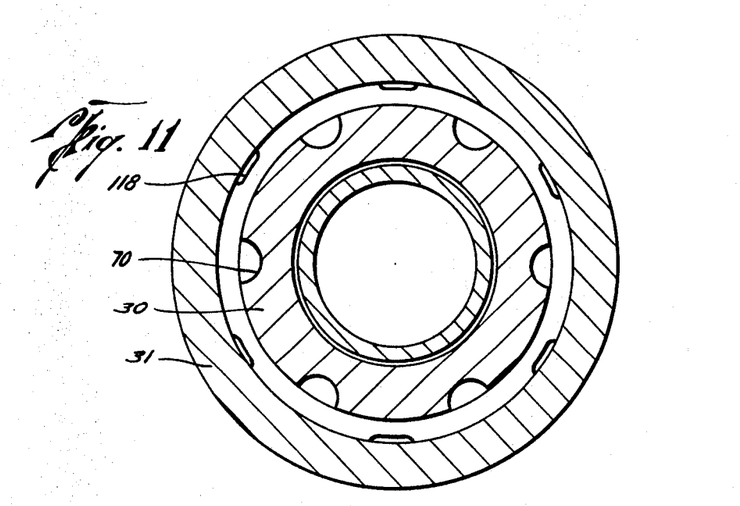
FIG. 11 is a horizontal section looking up at plane 11-11 of FIG. 1B.

Above the upper bearing means just described, the embodiment of FIGS. 8—10 may be of the same construction as shown in FIGS. 1A and 1B, and for a further description of the invention reference will once again be made to the latter two FIGS. As there shown and also in FIG. 11, the upper end of mandrel 30 is closely engaged by midportion 31 of the housing, thereby providing upper bearing means, and the upper end of the mandrel is fluted at 118 to provide means for passage of solids, similar to the upper bearing means of FIGS. 8—10 and the solids passage means 108 therepast.

In both the embodiment of FIGS. 1A and 1B and that of FIGS. 8—10, the means for passage of solids also provides fluid passage means so that solids can be flushed out or purged from the unit in a manner subsequently to be described.

Figure 12:
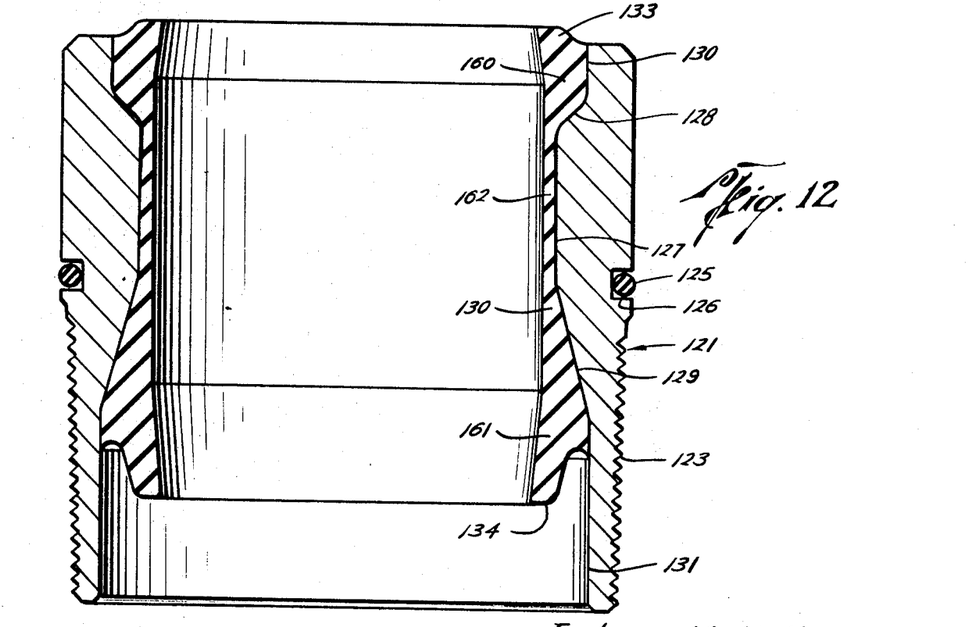
FIG. 12 is a vertical section to a larger scale showing the replaceable seal ring of the unit shown in FIG. 1A.

Referring now especially to FIG. 1A, and also to FIG. 12, screwed inside the upper end of mandrel 30 in socket 120 thereof is an annular seal means 121. The seal means includes a support ring 122 made of metal, e.g. steel, the same material as for the rest of the unit, except as noted. The exterior surface of support ring 122 is generally cylindrical but is slightly tapered and is threaded at 123 to engage threaded socket 120 of the mandrel. An elastomeric O-ring seal 125 is provided in annular groove 126 to seal between the support ring and the mandrel.

The inner surface of support ring 127 is cylindrical over a midportion 127, but is tapered at both sides 128, 129 of the midportion providing an inverted fusiform configuration. Beyond the sloping sides 128, 129, the inner surface of the support ring continues as cylindrical over end portions 130, 131 of the surface. Bonded to the inner surface of the support ring is a seal ring 130 made of rubber, neoprene, or other elastomer, preferably resistant to the fluids, e.g. air, water, oil, mud, and other drilling fluids and also other materials to which the unit is to be exposed and to the pressures and temperatures anticipated. The seal ring 130 has an exterior conforming to the interior of the support ring to which it is bonded; preferably it is vulcanized in situ. The inner periphery of the seal ring is generally cylindrical although at each end it is slightly tapered down to a smaller inner diameter, as shown in FIG. 12, in the unstressed condition. At the extremities of the seal ring are provided lips 133, 134. The seal ring is preferably unsymmetrical relative to a horizontal midplane, the upper lip 133 which is exposed on its upper or outer face to conduit pressure being short and blunt, whereas the lower lip 134 which is exposed on its lower or outer face to annulus, i.e. well bore pressure, is longer and hence more easily flexed.

Referring now especially to FIG. 1A, the upper portion 35 of the housing of the telescopic unit has a downwardly extending tubular nose portion 150 of smaller outer diameter than the inner diameter of the upper end of the midportion 31 of the housing. The nose portion 150 is externally tapered and threaded to engage the internally tapered and threaded socket 151 of connector 152. The outer diameter of connector 152 is smaller than the minimum inner diameter of socket 33 at the upper end of the midportion 31 of the housing to facilitate assembly. An elastomeric O-ring around nose 150 seals it to the socket 151. The lower end of connector 152 is internally tapered and threaded providing a socket 155 to receive the externally tapered and threaded pin 156 at the upper end of wash pipe 157. The wash pipe extends down inside seal means 121 and forms a sliding seal with the seal ring 130, the lips 133, 134 (FIG. 12) of the seal ring expanding to accommodate the wash pipe and sealing therewith. The midportion 127 of the seal ring backs up the end portions 160, 161 of the seal ring to prevent blowout of the seal rings. Only the thin neck 162 of the seal ring is unsupported axially by metal and since it is relatively thin and quite long, it can withstand considerable axial stress without exceeding its elastic limit. The elastomer ring will not be destroyed by sand or other abrasive material which might become trapped between the wash pipe and seal ring but instead will deform to accommodate such foreign matter. The seal between the wash pipe and seal ring will be maintained whether there is relative axial or rotary motion of the wash pipe and seal ring, such axial relative motion occurring in ordinary use and rotary relative motion occurring in the event of failure of the connector sub 41, e.g. at the intended weakest points 50, 51. If the seal ring wears out, the seal means can be replaced by unscrewing support ring 172 out of mandrel socket 120 and inserting a new seal means 121.

In this regard note that support ring 172 extends above socket 120 to allow a wrench to be applied to the support ring and that lip 133 extends above the upper end of the support ring so that no trap is formed wherein solids might accumulate and move between the seal ring and wash pipe in the event of a space opening up therebetween, e.g. in the case of a reversal of pressure differential, such as might be caused by a drop in conduit fluid (drill string fluid) pump pressure or due to rapid extension of the telescopic unit.

Figures 13, 14, 15:
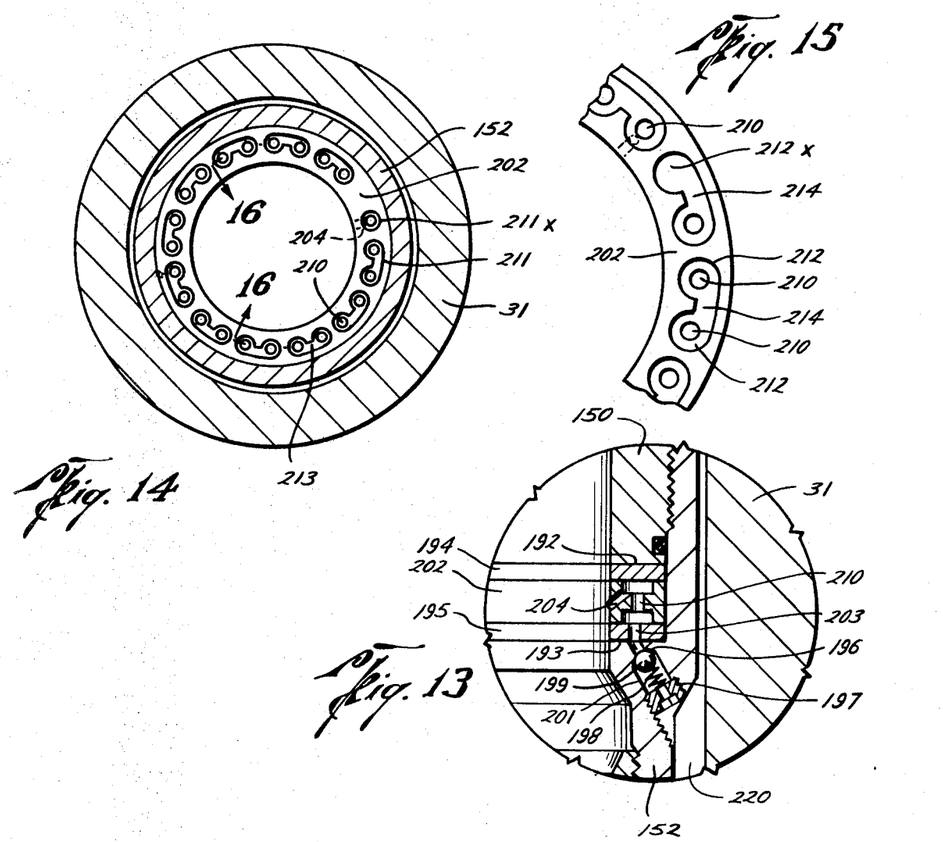
FIG. 13 is a fragmentary vertical section showing, to a larger scale, a modification of the bleed port means shown in FIG. 1A.
FIG. 14 is a vertical section looking down at section 14-14 of FIG. 1A.
FIG. 15 is a fragmentary view of the orifice ring of the telescopic unit, similar to FIG. 14 except looking up at the underside of the orifice ring.

In order to keep well bore fluid out of the annular space 170 between the wash pipe and the housing, thereby to reduce the likelihood of abrasive material getting between the seal ring and wash pipe, and to keep well bore fluid out of the annular clearance spaces between the upper and lower bearing means and the spline means and the axial travel limit stop means, there is provided bleed port means to admit high pressure fluid from the through fluid passage or conduit of the telescopic unit into the foregoing annular spaces or annulus thereby to fill such annulus with conduit fluid. The bleed port means includes downwardly opening flow passage 200 in connector 152. Preferably, as shown in FIG. 13, there is a downwardly opening, spring loaded, ball check valve mounted in an enlargement 201 of such passage. For liquid drilling the ball 199 could be made of light material such as Nylon or other plastics material and the spring 198 omitted, but for air drilling the ball would be made of steel or other metal and the spring, bearing against screw plug 197, would urge the ball to closed position against seat 196. With the exception of the inclusion of the check valve to prevent reverse flow in case of reversal of pressure differential, the construction of FIG. 13 is the same as that of FIG. 1A and reference may be made to both FIGS. in the following.

Referring also to FIGS. 13 through 16, the bleed port means further comprises an orifice ring 202 disposed between face plates 195, 194. Lower face plate 195 rests on shoulder 193 in connector 152. Upper face plate 154 is held down by the lower end 192 of nose 150 of the upper portion 35 of the housing. Ring 202 has a downwardly opening entry passage 204 on its inner periphery. The orifice ring 202, described in more detail hereinafter, together with the face plates 195, 196, provides means forming a long tortuous passage of reasonably large cross section connecting entry passage 204 with exit passage 203 and flow passage 200 or 201, so that a large pressure differential across the bleed port means will cause only a small fluid flow, yet the flow passage is not likely to become blocked with dirt or debris.

Figure 16:
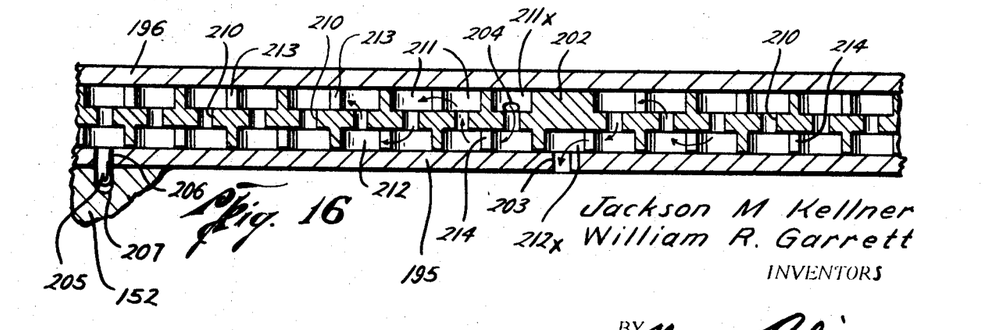
FIG. 16 is a developed sectional view taken at the cylindrical surface indicated at 16-16 of FIG. 14.

As shown in FIGS. 1A and 16, to insure that the exit passage 203 of face plate 195 registers with fluid passage 200 or 201 and that the orifice ring 202 is positioned with entry passage 204 close to the exit passage 203 the orifice ring 202 is provided with an alignment pin 205 which is assembled through alignment slot 206 in the orifice ring into alignment socket 207 in the connector 152.

The orifice ring 202 includes a plurality of vertically, i.e., axially, extending orifices 210. At their upper and lower ends the orifices are connected to expansion chambers 211, 212, which are cylindrical counterbores in the upper and lower faces of the orifice rings, the counterbores being of considerably larger diameter than the orifices. Upper adjacent pairs of the counterbores forming the upper chambers are connected by peripheral tangential interconnection passages 213. Lower adjacent pairs of the counterbores forming the lower chambers, the lower pairs being staggered relative to the upper paris, are connected by peripheral tangential interconnection passages 214.

Together with the face plates 195, 196, which are ground smooth to seal with the ground faces of the orifice ring and close the counterbores, the orifice ring 202 forms a tortuous passage, indicated by the arrows in FIG. 16, connecting the entry port 204 to the exit port 203.

Referring to FIGS. 15 and 16, it is to be noted that the last counterbore 212X in the bottom of the orifice ring does not connect to an orifice thereabove but instead connects to the exit port 203. Similarly, as shown in FIGS. 14 and 16, the last counterbore 211X in the top of the orifice ring does not connect with an interconnection passage 214 but instead connects to entry passage 204.

It is also to be noted that fluid going through the tortuous passage of the bleed port means is alternately constricted and expanded going from an orifice to an expansion chamber to an interconnecting passage to another expansion chamber and thence to another orifice. Furthermore the fluid must continually change direction and at times flow radially inward following a circumferential acceleration as it goes from one counterbore to the next. This causes a substantial pressure drop as in an inefficient nozzle, without causing a high velocity. Yet the size of the passages are relatively large.

When the telescopic unit is in use, conduit fluid enters the orifice ring through entry port 204, goes through the tortuous passage provided by the circumferentially spaced apart orifices 210 and the counterbores 211, 212, and the interconnecting passages 213, 214, and exits through port 203 in face plate 195, from which it goes through passage 200 or 201 (past the check valve) into the annulus 220 (FIG. 3) where it displaces any fluid that has entered the annulus of the unit from the space outside the telescopic unit in the well or other earth bore. This constant purging of the annulus of the unit keeps out the external fluid which might contain abrasives and other materials that would be harmful to the interior of the telescopic unit, especially to its relatively sliding seal, bearing, spline, and stop surfaces.

Figures 17, 18:
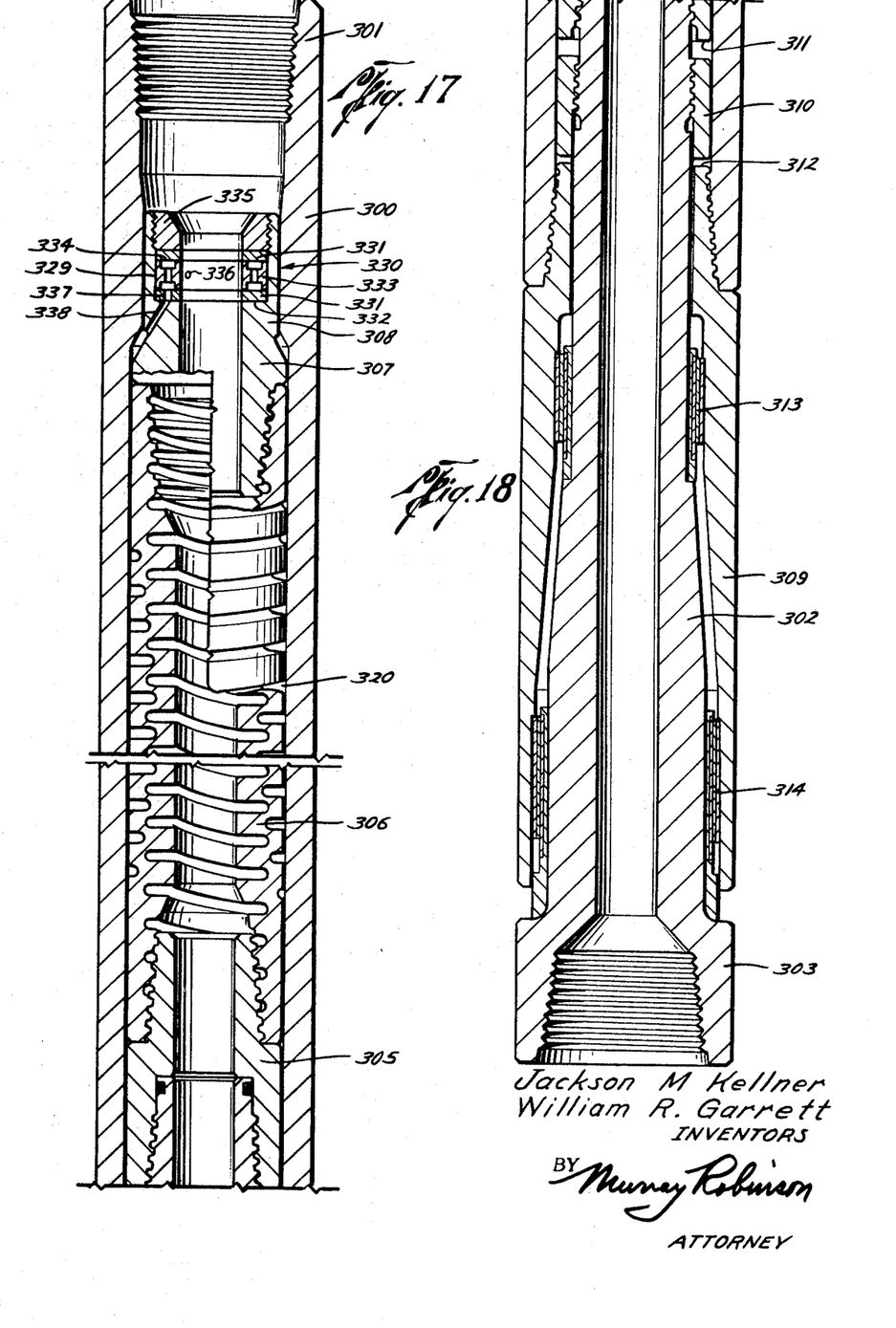
FIGS. 17 and 18 together form a vertical section through another type of telescopic drill string unit embodying features of the invention, such unit being a vibration dampener.

Referring now to FIGS. 17 and 18 there is shown an embodiment of certain aspects of the invention in another form of telescopic unit which is particularly adapted to reduce the transmission of vibration and shock loads from the bit or lower portion of a drill string to the upper portion thereof. For a detailed description of a telescopic unit of this type reference may be made to the aforementioned U.S. Pat. No. 3,447,340. Generally speaking the unit includes an outer tube including an upper housing portion 300 having a threaded box 301 at its upper end and an inner tube including a lower mandrel portion 302 having a threaded box 303 at its lower end. The unit thus is especially adapted to be connected directly at its lower end to the usual drill bit pin and at its upper end to the usual pin at the lower end of a drill collar or other lower drill string member.

The lower mandrel portion is screw connected to intermediate mandrel portion or sub 305 which in turn screw connects to a resilient, helically corregated spring pipe or upper mandrel portion 300. The spring pipe transmits fluid, torque, and axial forces. The upper end of the spring pipe 306 is screw connected to an upper connector or sub 307. Sub 307 has a pin 308 at its upper end which is shrink fitted into upper housing portion 300. The sub transmits fluid and seals between the mandrel and housing, as well as transmitting torque and axial forces therebetween. A lower housing portion 309 is screw connected to upper housing portion 300. Split and welded nut 310 engages the lower end 311 of connector 305 and the upper end 312 of lower housing portion 309 to limit contraction and extension of the telescopic unit.

Upper and lower bearing means 313, axially spaced apart, transmit bending moment between mandrel and housing.

In order to purge the annulus 320 between the outer tube or housing and the inner tube or mandrel, bleed port means 330 is provided in a counterbore 329 in the top sub 300. The bleed port means 330 is the same as that described in FIGS. 13—16 and hence need not be described in detail. It includes a lower face plate 331 resting on counterbore shoulder 332, an orifice ring 333, an upper face plate 334, and a retainer ring 335. There is an entry port 336 in the orifice ring and an exit port 337 in the lower face plate, the latter connecting with passage 338 leading to the annulus of the unit. Alignment means, not shown, will be provided as in the previously described embodiments to insure proper azimuthal positioning of the orifice ring and lower face plate relative to passage 338. As in the previously described embodiments the bleed port means will cause a slight flow of conduit fluid into the unit annulus to purge it of external fluid. This protects the relatively sliding surfaces of the spring pipe and housing, the stop nut and housing, and the bearing means, which might otherwise be damaged by deleterious materials brought in with the external fluid.

While preferred embodiments of the invention have been shown and described other modifications and variations will occur to one skilled in the art without departing from the spirit of the invention.

We claim:

1. Telescopic unit including
    an inner tube having means at one end for connection to a drill string,
    an outer tube around the inner tube defining an annulus therebetween and having means at an opposite end for connection to a drill string, said outer tube being axially movable relative to the inner tube,
    seal means sealing between the inner tube and outer tube to provide a through fluid passage from said one end of the inner tube to said opposite end of the outer tube,
    means to limit relative contraction and extension of the unit,
    bearing means to transmit bending moment between the inner tube and outer tube, and
    means to purge the annulus between the inner tube and outer tube providing a path for flow of fluid from the interior of the unit to the exterior of the unit through said annulus.

2. Unit according to claim 1 wherein said means to purge the annulus comprises bleed port means communicating with the fluid passage through the unit and with said annulus at a point downstream from said seal means with respect to flow from the interior of said unit to the exterior of said unit.

3. Telescopic unit including
    an inner tube having means at one end for connection to a drill string,
    an outer tube around the inner tube and having means at an opposite end for connection to a drill string, said outer tube being axially movable relative to the inner tube,
    seal means sealing between the inner tube and outer tube to provide a through fluid passage from said one end of the inner tube to said opposite end of the outer tube,
    means to limit relative contraction and extension of the unit,
    bearing means to transmit bending moment between the inner tube and outer tube, and
    means to purge the annulus between the inner tube and outer tube,
    said means to purge the annulus comprising bleed port means communicating with the fluid passage through the unit and with said annulus,
    said bleed port means comprising a tortuous passage including a plurality of orifices connected by expansion chambers.

4. Unit according to claim 3 wherein the bleed port means includes an orifice ring disposed between two face plates, the ring having a plurality of vertical orifices therethrough circumferentially spaced apart around the ring, there being upper and lower counterbores of larger diameter than the orifices at the upper and lower ends of the orifices, upper pairs of adjacent counterbores at the upper ends of the orifices being joined by interconnecting passages, lower pairs of adjacent counterbores at the lower ends of the orifices being joined by interconnecting passages, the lower pairs being staggered relative to the upper pairs, the counterbores forming said expansion chambers.

5. Unit according to claim 4, said interconnecting passages being tangential to said counterbores and not crossing the line joining the centers of the counterbores.

6. Unit according to claim 5 wherein an upper counterbore is unconnected to any adjacent counterbore but communicates with an entry port extending radially downward to the inner periphery of the ring.

7. Unit according to claim 6 wherein a lower counterbore is in register with an exit port extending down through the lower face plate.

8. Unit according to claim 7 wherein the exit port is in register with a downwardly opening passage in the outer tube communicating with said annulus.

9. Unit according to claim 8 including a check valve in said downwardly opening passage and opening to fluid flow toward said annulus.

10. Unit according to claim 3 including a check valve in said bleed port means, said check valve opening to fluid flow toward said annulus.

11. Telescopic unit including
an inner tube having means at one end for connection to a drill string,
an outer tube around the inner tube and having means at an opposite end for connection to a drill string, said outer tube being axially movable relative to the inner tube,
seal means sealing between the inner tube and outer tube to provide a through fluid passage from said one end of the inner tube to said opposite end of the outer tube,
means to limit relative contraction and extension of the unit,
bearing means to transmit bending moment between the inner tube and outer tube, and
means to purge the annulus between the inner tube and outer tube,
said seal means including a seal pipe connected to said outer tube and extending inside said inner tube,
said seal means further including a metal ring connected to said inner tube and an elastomeric seal ring backed up by said metal ring with respect to axial pressure and bonded thereto, said elastomeric ring sealing around said seal pipe.

12. Unit according to claim 11 wherein said metal ring is removably screwed into said inner tubes, and said bearing means includes the outer periphery of said inner tube around said metal ring and the adjacent inner periphery of said outer tube, said unit including axially extending material passage means for passage of fluids and solids past said bearing means, said material passage means being formed between said inner and outer peripheries.

13. Unit according to claim 11 wherein said metal ring has an inner periphery of inverted fusiform configuration and said elastomeric ring extends inside the smallest diameter portion of the inner periphery of the ring.

14. Telescopic unit including
an inner tube having means at one end for connection to a drill string,
an outer tube around the inner tube and having means at an opposite end for connection to a drill string, said outer tube being axially movable relative to the inner tube,
seal means sealing between the inner tube and outer tube to provide a through fluid passage from said one end of the inner tube to said opposite end of the outer tube,
means to limit relative contraction and extension of the unit,
bearing means to transmit bending moment between the inner tube and outer tube, and
means to purge the annulus between the inner tube and outer tube,
said means to limit extension and contraction of said unit including an annular member screwed into said outer tube, said member being split axially into a number of separate portions.

15. Unit according to claim 14 including spline means to transmit torque between the inner tube and the outer tube, said spline means including one portion on said inner tube and another portion on said outer tube, the portion on said outer tube being formed on said split annular member.

16. Unit according to claim 15 wherein the portion of the spline means on the outer tube includes a plurality of flutes in said annular member and the portion of the spline means on the inner tubes includes a plurality of flutes on said inner tube an said spline means further includes a plurality of keys received in said flutes.

17. Unit according to claim 16 wherein said keys are cylindrical pins and said flutes include cylindrical surfaces.

18. Unit according to claim 17 wherein said cylindrical surfaces on the annular member are relieved on the leading edges thereof, the leading edges being judged with respect to the hand of said drill stem connection means at the ends of the tubes.

19. Unit according to claim 17 wherein said cylindrical surfaces on the inner tube are relieved on the trailing edges thereof, the trailing edges being judged with respect to the hand of said drill stem connection means at the ends of the tubes.

20. Unit according to claim 17 wherein said bearing means includes the inner periphery of said annular member cooperating with the outer periphery of said inner tube, said unit including axially extending material passage means for passage of fluids and solids past said bearing means formed between said inner tube and annular member, said material passage means being disposed between said spline means.

21. Unit according to claim 20 wherein said annular member is split along said material passage means.

22. Unit according to claim 20 wherein said outer tube has a seal pipe connected thereto extending inside inner tube and said seal means includes a metal ring and an elastomeric seal ring backed up by said metal ring with respect to axial pressure and bonded thereto, said elastomeric ring sealing around said seal pipe, said metal ring being removably screwed into said inner tube, and said bearing means further comprising a second part including the outer periphery of said inner tube around said metal seal ring and the adjacent inner periphery of said outer tube, said unit including further axially extending material passage means for passage of fluids and solids past said second part of the bearing means, said further material passage means being formed between the last said inner and outer peripheries.

23. Unit according to claim 22 wherein the first said material passage means comprises flutes on the inner periphery of said split annular member and the second said material passage means comprises flutes in the outer periphery of said inner tube.

24. Unit according to claim 23 wherein said flutes on said inner tube forming said material passage means are staggered relative to said flutes on said inner tube forming part of said splines and do not axially overlap same.

25. Unit according to claim 24 wherein the portion of said inner tube carrying said flutes forming said material passage means is of larger outer diameter than the portion of said inner tube carrying flutes forming part of said spline means with a downwardly facing shoulder formed between the last said portions of said inner tube, said downwardly facing shoulder cooperating with said annular member to form said means limiting extension of said unit.

26. Unit according to claim 25 wherein said downwardly facing shoulder is conical flaring upwardly and the upper end of said annular member is correlative thereto, the upper end of said annular member lying within said outer tube.

27. Unit according to claim 16 wherein said outer tube includes an upper portion and a lower portion and said split annular member forms a connector therebetween.

28. Unit according to claim 2 including means to retain said keys in the lower part of said annular member.

29. Unit according to claim 28 including shoulder stop means at the upper end of said annular member engageable with shoulder stop means on said outer tube to limit make up of said annular member into said outer tube.

30. Unit according to said claim 27 including means to retain said keys in the upper part of said annular member.

31. Unit according to claim 30 including shoulder stop means at the upper end of said annular member engageable with shoulder stop means on said outer tube to limit make up of said annular member into said outer tube.

32. Unit according to claim 15 wherein said outer tube includes an upper portion and a lower portion and said split annular member forms a connection therebetween, said spline means on the inner tube includes a plurality of flutes on the inner tube and said spline means on the outer tube includes a plurality of keys integral with the annular member and confined in length to the lower portion of said annular member.

33. Unit according to claim 32 including shoulder stop means at the upper end of said annular member engageable with shoulder stop means on said outer tube to limit make up of said annular member into said outer tube.

34. Unit according to claim 32 wherein the outermost sides of the outermost keys of each segment of the annular member are substantially parallel.

35. Unit according to claim 27 wherein said annular member includes a tapered threaded pin at each end screwed into said upper and lower portions of the outer tube.

36. Unit according to claim 35 wherein said annular member includes an outwardly extending external flange extending between said upper and lower portions, said annular member being unthreaded and relieved on its outer periphery adjacent said flange.

37. Unit according to claim 35 wherein said annular member lies wholly inside said upper and lower portions of said outer tube, the lower end of said upper portion engaging the upper end of said power portion, said annular member being unthreaded and relieved on its outer periphery adjacent the juncture of said upper and lower portions.

38. Unit according to claim 17 wherein there are two keys per segment of said annular member.

39. Unit according to claim 17 wherein there are three keys per segment of said annular member and said annular member is split along planes passing through flutes therein.

40. Telescopic unit including
an inner tube having means at one end for connection to a drill string,
an outer tube around said inner tube and having means at one end for connection to a drill string, said outer tube being axially movable relative to the inner tube,
means to limit relative contraction and extension of the unit,
bearing means to transmit bending moment between the inner tube and outer tube, and
spline means to transmit torque between said inner tube and outer tube,
said means to limit extension and contraction of the unit including an annular member screwed into said outer tube, said annular member being split axially into a number of separate portions, said spline means including one portion on said inner tube and another portion on said outer tube, the portion of said spline means on said outer tube being formed on said split annular member.

41. Unit according to claim 40 wherein the portion of the spline means on the outer tube includes a plurality of flutes in said annular member and the portion of the spline means on the inner tube includes a plurality of flutes on said inner tube and said spline means further includes a plurality of keys received in said flutes.

42. Unit according to claim 41 wherein said keys are cylindrical pins and said flutes include cylindrical surfaces.

43. Unit according to claim 42 wherein said cylindrical surfaces on the annular member are relieved on the leading edges thereof, the leading edges being judged with respect to the hand of said drill stem connection means at the ends of the tubes.

44. Unit according to claim 42 wherein said cylindrical surfaces on the inner tube are relieved on the trailing edges thereof, the trailing edges being judged with respect to the hand of said drill stem connection means at the ends of the tubes.

45. Unit according to claim 42 wherein said bearing means includes the inner periphery of said annular member cooperating with the outer periphery of said inner tube, said unit including axially extending material passage means for passage of fluids and solids past said bearing means formed between said inner tube and annular member, said material passage means being disposed between said spline means.

46. Unit according to claim 45 wherein said annular member is split along said material passage means.

47. Unit according to claim 40 wherein said inner tube includes a downwardly facing shoulder cooperating with a shoulder at the upper end of said split annular member providing said means to limit extension of said unit, and wherein said downwardly facing shoulder is conical flaring upwardly and the upper end of said annular member is correlative thereto, the upper end of said annular member lying within said outer tube.

48. Unit according to claim 47 wherein said outer tube includes an upper portion and a lower portion and said split annular member forms a connector therebetween.

49. Unit according to claim 48 including means to retain said keys in the lower part of said annular member.

50. Unit according to claim 49 including shoulder stop means at the upper end of said annular member engageable with shoulder stop means on said outer tube to limit make up of said annular member into said outer tube.

51. Unit according to claim 48 including means to retain said keys in the upper part of said annular member.

52. Unit according to claim 51 including shoulder stop means at the upper end of said annular member engageable with shoulder stop means on said outer tube to limit make up of said annular member into said outer tube.

53. Unit according to claim 40 wherein said outer tube includes an upper portion and a lower portion and said split annular member forms a connection therebetween, said spline means on the inner tube includes a plurality of flutes on the inner tube and said spline means on the outer tube includes a plurality of keys integral with the annular member and confined in length to the lower portion of said annular member.

54. Unit according to claim 53 including shoulder stop means at the upper end of said annular member engageable with shoulder stop means on said outer tube to limit make up of said annular member into said outer tube.

55. Unit according to claim 53 wherein the outermost sides of the outermost keys of each segment of the annular member are substantially parallel.

56. Unit according to claim 48 wherein said annular member includes a tapered threaded pin at each end screwed into said upper and lower portions of the outer tube.

57. Unit according to claim 56 wherein said annular member includes an outwardly extending external flange extending between said upper and lower portions, said annular member being unthreaded and relieved on its outer periphery adjacent said flange.

58. Unit according to claim 56 wherein said annular member lies wholly inside said upper and lower portions of said outer tube, the lower end of said upper portion engaging the upper end of said lower portion, said annular member being unthreaded and relieved on its outer periphery adjacent the juncture of said upper and lower portions.

59. Unit according to claim 42 wherein there are two keys per segment of said annular member.

60. Unit according to claim 42 wherein there are three keys per segment of said annular member and said annular member is split along planes passing through flutes therein.

61. Telescopic unit including
an inner tube having means at one end for connection to a drill string,
an outer tube around said inner tube and having means at one end for connection to a drill string, said outer tube being axially movable relative to the inner tube,
means to limit relative contraction and extension of said unit,
bearing means to transmit bending moment between the inner tube and outer tube, and
seal means sealing between outer tube and inner tube, said outer tube having a seal pipe connected thereto extending inside said inner tube and said seal means including a metal ring and an elastomeric seal ring backed up by said metal ring with respect to axial pressure and bonded thereto, said elastomeric ring sealing around said seal pipe.

62. Unit according to claim 61 wherein said metal ring has an inner periphery of inverted fusiform configuration and said elastomeric ring extends inside the smallest diameter portion of the inner periphery of the ring.

63. Telescopic unit including an inner tube having means at one end for connection to a drill string, an outer tube around said inner tube and having means at one end for connection to a drill string, said outer tube being axially movable relative to the inner tube, means to limit relative contraction and extension of said unit, bearing means to transmit bending moment between the inner tube and outer tube, and seal means sealing between said outer tube and inner tube, and means to transmit torque between said inner tube and said outer tube, said inner tube including a spring pipe connected at its upper end to said outer tube and at its lower end to the remainder of said inner tube, and means to purge the annulus between the inner tube and outer tube including the portion of said annulus around said spring pipe.

64. Unit according to claim 4 wherein an upper counterbore is unconnected to any adjacent counterbore but communicates with an entry port extending radially downward to the inner periphery of the ring.

65. Unit according to claim 4 wherein a lower counterbore is in register with an exit port extending down through the lower face plate.

66. Unit according to claim 65 wherein the exit port is in register with a downwardly opening passage in the outer tube communicating with said annulus.

67. Unit according to claim 2 including a check valve in said bleed port means passage and opening to fluid flow toward said annulus.

68. Unit according to claim 2 including spline means to transmit torque between said inner tube and said outer tube, said spline means being located in the portion of said annulus that is downstream from said seal means as aforesaid.